United States Patent
Andersen et al.

(10) Patent No.: US 8,733,808 B2
(45) Date of Patent: May 27, 2014

(54) PET EXCREMENT TOOL WITH INTERGRATED AND SELECTIVELY ACTIVATED LIGHTING

(76) Inventors: Peter Andersen, Glen Ellyn, IL (US); Peter Ahern, Sugar Grove, IL (US)

(*) Notice: Subject to any disclaimer, the term of this patent is extended or adjusted under 35 U.S.C. 154(b) by 1 day.

(21) Appl. No.: 13/609,764

(22) Filed: Sep. 11, 2012

(65) Prior Publication Data

US 2013/0062896 A1 Mar. 14, 2013

Related U.S. Application Data

(60) Provisional application No. 61/573,598, filed on Sep. 12, 2011.

(51) Int. Cl.
*A01K 29/00* (2006.01)
(52) U.S. Cl.
USPC .......................................... 294/1.4; 362/120
(58) Field of Classification Search
USPC ............... 294/1.3–1.5, 209, 50.8, 115, 176; 362/102, 109, 119, 120, 253; 15/104.8, 15/257.1, 257.2, 257.6; 119/161, 867; D30/162
See application file for complete search history.

(56) References Cited

U.S. PATENT DOCUMENTS

| | | | | | |
|---|---|---|---|---|---|
| 4,225,174 | A | * | 9/1980 | Hennessy et al. | 294/1.4 |
| 4,247,139 | A | * | 1/1981 | Grieb | 294/1.4 |
| 4,248,468 | A | * | 2/1981 | Hastings | 294/1.4 |
| 4,878,703 | A | * | 11/1989 | Yoshioka | 294/1.5 |
| 5,503,442 | A | * | 4/1996 | Lee | 294/1.4 |
| 5,601,321 | A | * | 2/1997 | Simon | 294/1.4 |
| 2006/0266397 | A1 | * | 11/2006 | Berl | 135/70 |

* cited by examiner

*Primary Examiner* — Stephen Vu

(57) ABSTRACT

An animal waste collection device is able to illuminate the area where a pet has left fecal matter at night by a battery operated lighting system build into the device. The device consists of two separate lighting systems, one operated by either of two momentary switches located in the handle of the device located on the right end and the left end of the handle. When either button is depressed the general area where the pet has left the fecal matter is illuminated by two LED lights, one of each side of the device. The operator will pull the operating handle upward to open the two opposing jaws of the device. On the opening of the jaws, two additional LED lights will illuminate, activated by a micro switch sensing the opening of the waste collection jaws over the fecal matter being collected. On collection of the fecal matter into the hopper of the device, the operator releases the activation handle and the two LED lights illuminating the hopper area turn off. The device also contains reflective tape on each side of the device so that when the operator is walking their pet at night, there is a potential for someone seeing the reflective tape and realize that there is a person walking their pet.

3 Claims, 5 Drawing Sheets

PET EXCREMENT TOOL WITH INTERGRATED AND SELECTIVELY ACTIVATED LIGHTING

RELATED APPLICATION

The present application claims priority under 35 U.S.C. Section 120 based on Provisional Application No. 61/573,598 filed on Sep. 12, 2011.

BACKGROUND OF THE INVENTION

The present invention relates to the field of pet excrement collection tools.

Pet owners often walk those pets during darkness and experience the need to pick up the pets' excrement and to light their own way in the darkness. Sometimes those pet owners also experience the need to enhance their own visibility to others, such as drivers of passing motor vehicles or bicycles.

Various solutions to these problems have been proposed by others, but these solutions often other a solution to only one of the problems mentioned above, or are rather clumsy integrations of lighting and pet excrement tools that do not adequately address the needs of a pet owner that must control the pet with a leash or similar tool with one hand while removing excrement with the other.

The present invention offers pet owners an integrated tool for removing pet excrement while conveniently activating lighting to assist in excrement removal. Optionally, the tool of the present invention may allow the pet owner to conveniently activate lighting to assist the pet owner to see sidewalks and obstacles and to make herself visible to others. The lighting devices of the present invention are integrated into the design of the pet excrement tool and provide for convenient activation of the lighting device by a pet owner that is also controlling a pet via a leash or similar tool with another hand.

DETAILED DESCRIPTION

Figure 1:
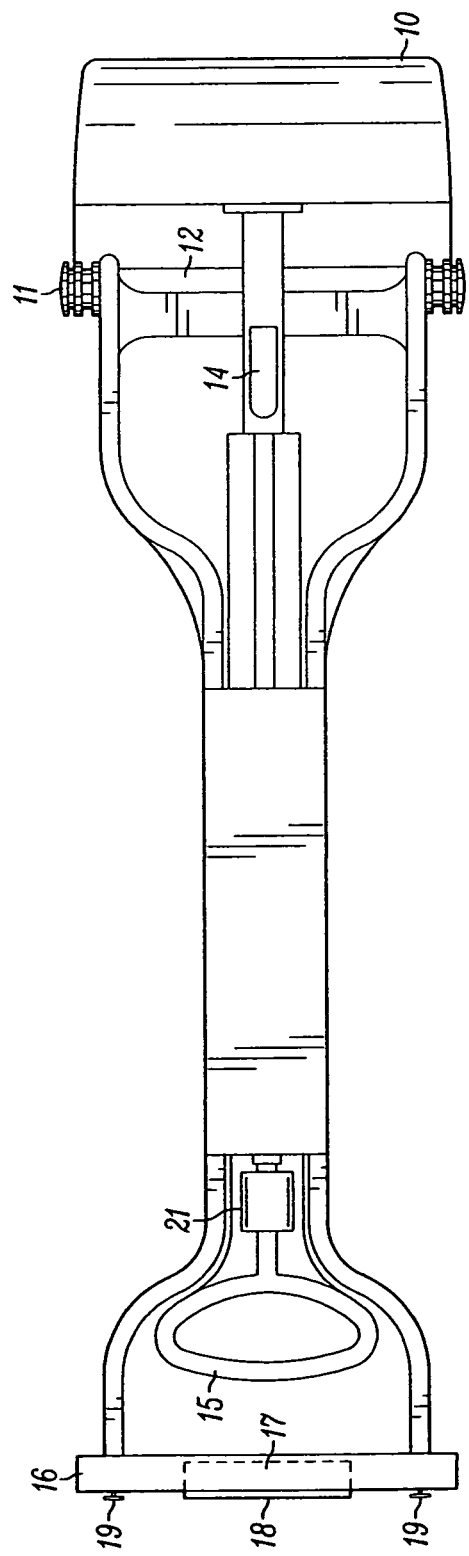
FIG. 1 illustrates In side view one embodiment of the present invention.

FIG. 1 shows a side view of a pet excrement collection tool according to one embodiment of the present invention. Pick-Up Hopper Assembly 10 is opened by pulling Spring Loaded Movable Pick-up Hopper activation Handle 15 upward resulting in separation of the opposing jaws of the Pick-Up Hopper Assembly 10 (See FIGS. 3 & 4). The open jaws are then placed around the pet fecal matter having been deposited on the ground. Releasing the spring loaded Movable Pick-up Hopper Activation Handle, 15, the opposing jaws of the Pick-Up Hopper Assembly 10 will close.

Prior to the above-identified activity, if the pet owner is out with their pet in a dark area of at night, the operator would depress either of the handle mounted electrical switches 19 located at the two ends of the Fixed Handle 16, causing battery power to be applied to ground illumination lights 14, thus illuminating the general ground area where the pet bad deposited their fecal matter allowing the operator to identify its location. This action can also be used by the operator to illuminate sidewalks or obstacles to assist in general navigation while walking a pet during darkness. On pulling the Spring Loaded Movable Pick-up Activation Handle 15 upward as explained above the Pick-up Hopper Lights Activation Micro Switch 21 will provide battery power to the two LED Pick-up Hopper Lights 13 (see FIG. 4), illuminating Pick-up Hopper Assembly 10 and the ground below. On release of the handle, the Spring Loaded Movable Pick-Up Hopper Activation Handle 15 will pull the handle downward closing the Pick-up Hopper Assembly 10 and releasing the switching mechanism of the Pick-up Hopper Light Activation Micro Switch 21 and cutting off the power to the Pick-up Hopper Lights 13.

The four (4) AA batteries required to power the four (4) LED lights are located in the Fixed Handle 16 in the Battery Compartment 17. As is conventional, wires connect the batteries to switches 19 and 21 and Lights 13 and 14. One pair of wires connect switches 19 (wires in parrallel) to lights 14 and another pair of wires connect switch 21 to lights 13. Switches 19 and 21 are arranged to complete circuits providing power from batteries 20 to lights 14 and 13, respectively, when each switch is closed. These wires can be enclosed within the various housing portions of the tool or could be external to the housing.

Figure 2:
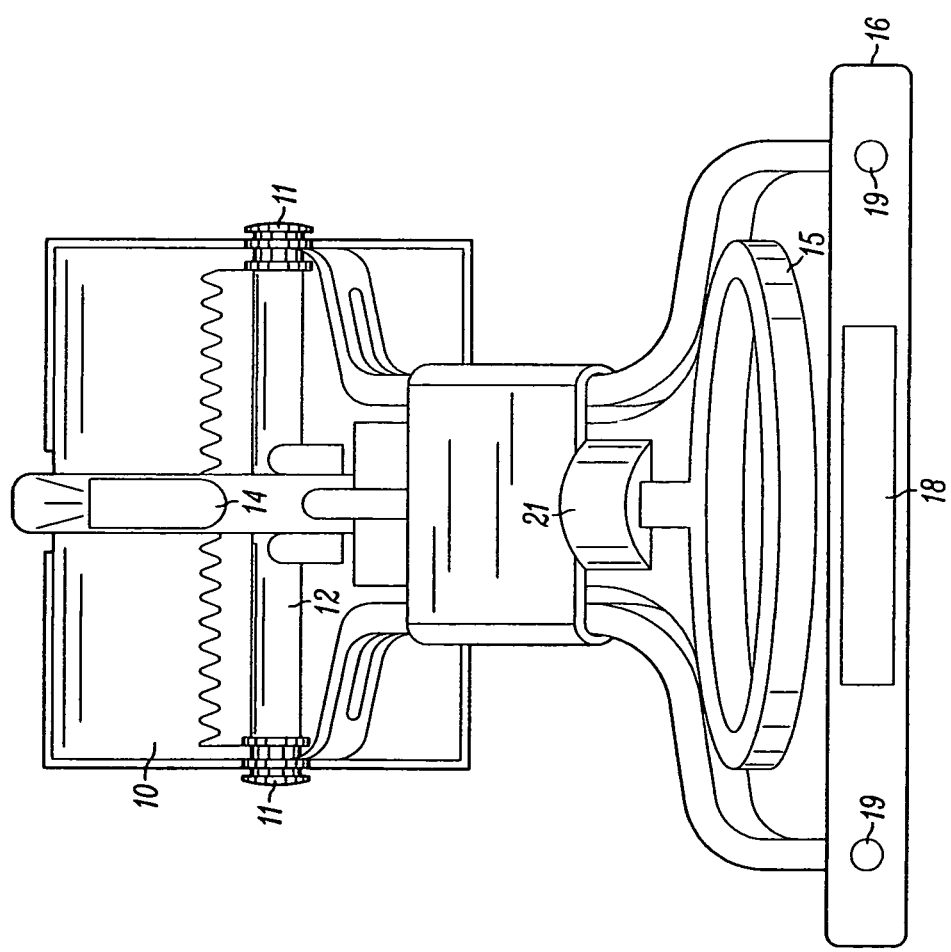
FIG. 2 illustrates in top perspective view the device of FIG. 1.

FIG. 2 is a top perspective view of the device of FIG. 1 from the Fixed Handle 16 downward to the Pick-up Hopper Assembly 10 with the two jaws of the assembly in the open position.

Figure 3:
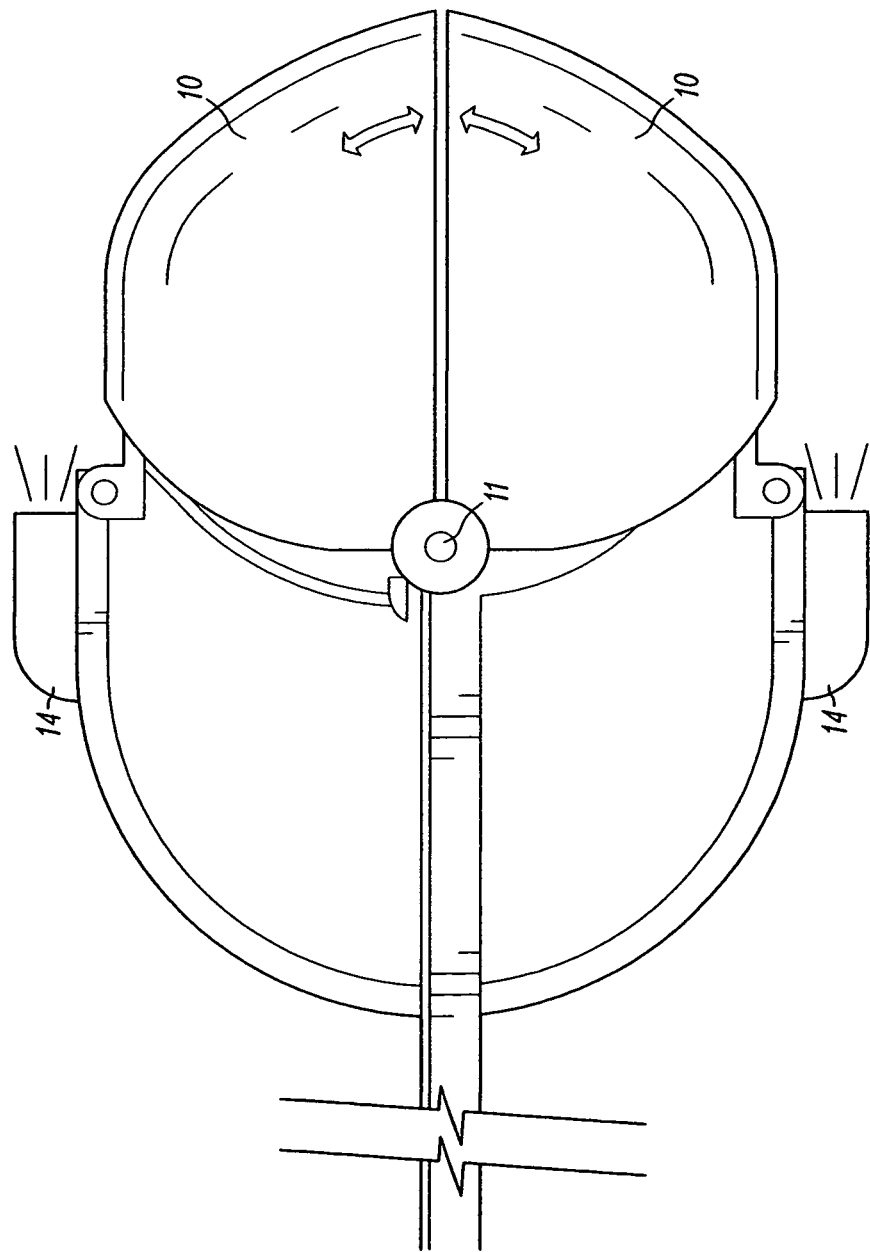
FIG. 3 illustrates in side view the bottom portion of the device of FIG. 1.

FIG. 3 is a side view of the bottom, portion of the device of FIG. 1 with the two jaws of the Pick-up Hopper Assembly 10 with the jaws in the closed position as well as the Two LED Side Ground Lights 14. As is apparent, Side Ground Lights 14 can be used, when illuminated, both, to find pet excrement and to illuminate sidewalks, curbs and other obstacles in order to assist in general navigation while walking a pet during darkness.

Figure 4:
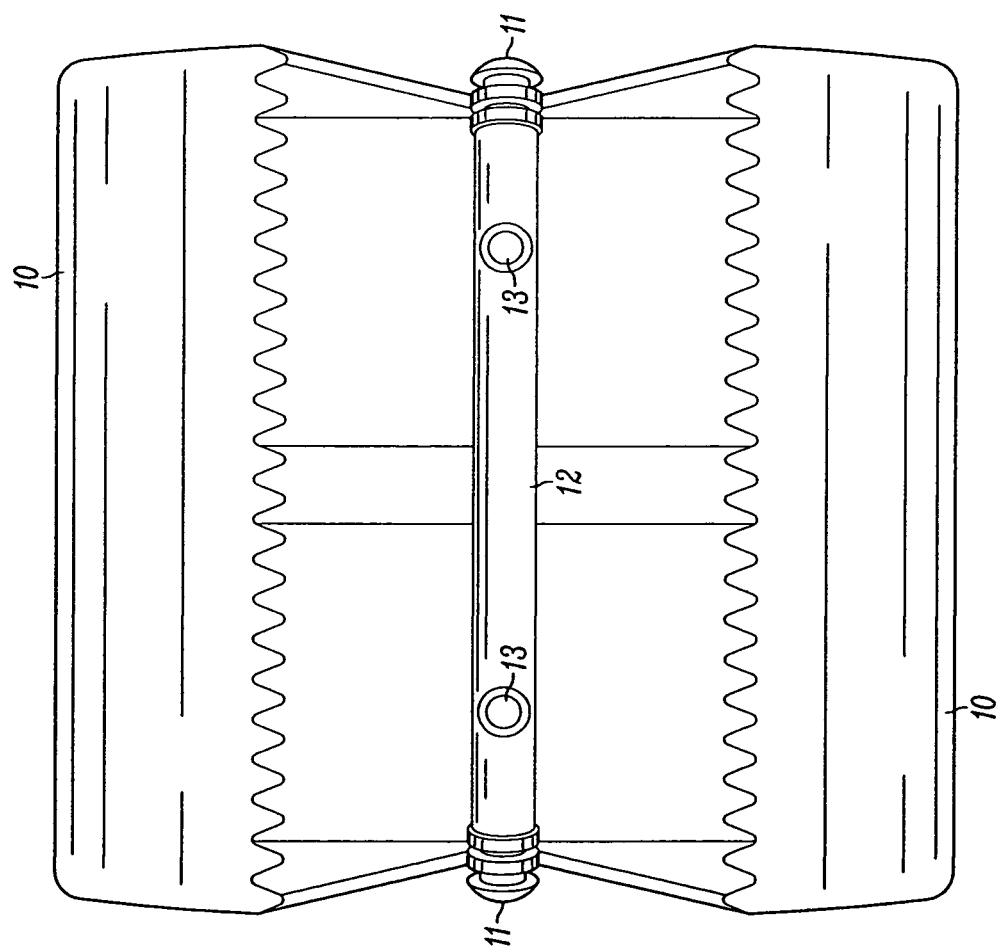
FIG. 4 illustrates in bottom view the device of FIG. 1.

FIG. 4 is a close up view of the Pick-up Hopper Assembly 10 with the two jaws in the closed position, and the Two LED Pick-Up Hopper Side Ground Lights 14.

Figure 5:
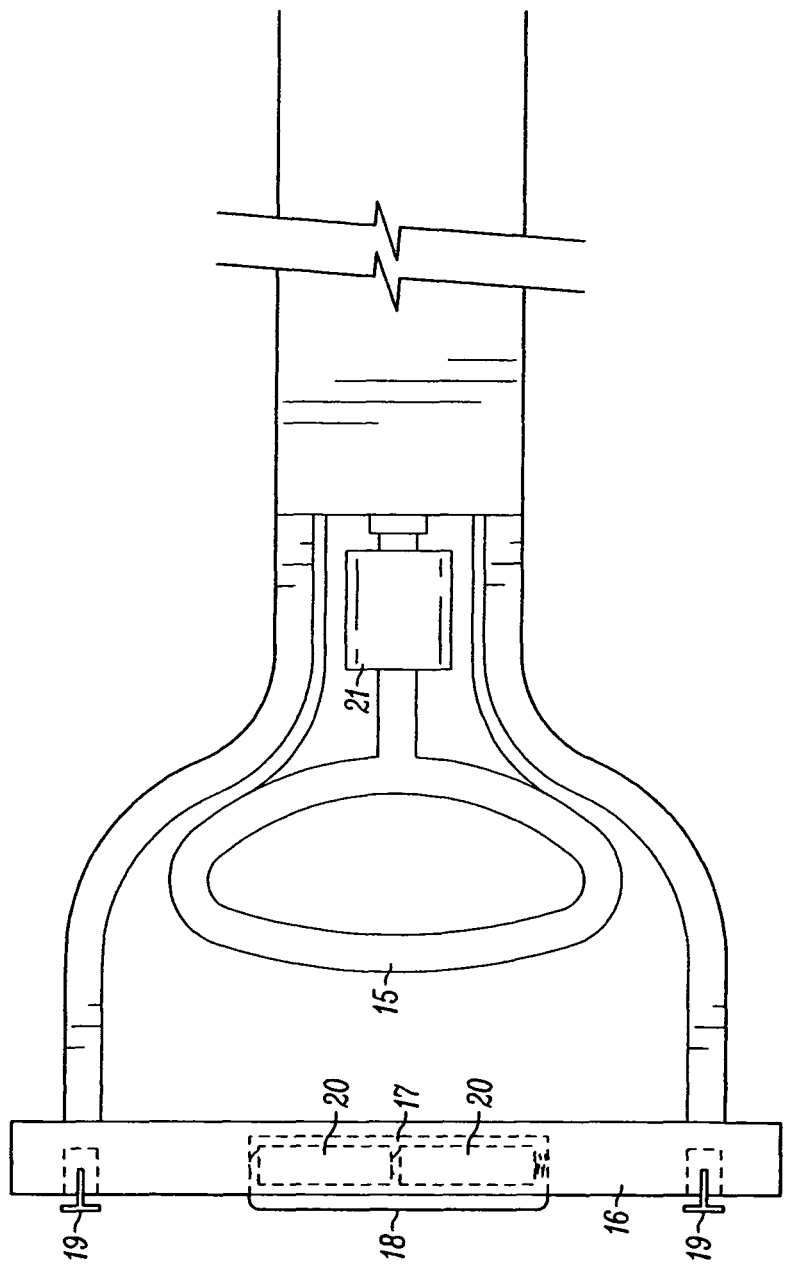
FIG. 5 illustrates in side view the top portion of the device of FIG. 1.

FIG. 5 is a close up view of the handle area consisting of the Spring Loaded Movable Pick-Up Hopper Activation Handle 15, the Fixed Handle 16, the Battery Compartment 17 the Battery Compartment Cover 18, two electrical switches to activate the two LED Pick-Up Hopper Side Lights item 19 and the four (4) AA batteries 20 needed to power the four (4) LED lights, and the Pick-up Hopper Light Activation Micro Switch item 21.

Certain features and potential modifications to the invention described above should apparent from the drawings and description. In FIG. 3 it Is apparent that side ground lights 14 are positioned so as to primarily illuminate the ground surrounding the closed Pick-up Hooper assembly 10. While this arrangement may be useful in permitting the pet owner to locate pet feces and to illuminate curbs, sidewalks and other potential obstacles, it might also be advantageous to arrange one or both of Side Ground Lights 14 to point in a direction more nearly perpendicular to the long axis of the tool. This might be better for illuminating such potential obstacles and may also improve the visibility of the pet owner to operators of nearby cars, bicycles and the like much in the manner that a bicycle headlight improves the visibility of the bicycle. Another possible modification intended to improve visibility involves adding reflective tape to the sides of the tool and optionally to aim one of both of Side Ground Lights 14 to illuminate the reflective tape. Additional lights activated by switches 19 might also be added for the purpose of improved visibility without sacrificing the utility of illuminating the ground surrounding Hopper 10.

If it should be desired to reduce the cost and complexity of the device described above, it would be possible to eliminate microswitch 21 and to activate all of the lights by means of switches 19. Having more LEDs activated when switches 19 are operated will increase the power consumed from batteries 20, of course, and so may require the addition of more or larger battery cells.

We claim:

1. A pet excrement collection tool comprising:
    an elongated bar having a first end and a second end;
    a first manually-operated mechanism mounted near the first end of the elongated bar, the first manually-operated mechanism further comprising:
        a first handle portion; and
        a second handle portion; and
        a switch;
    a second manually-operated mechanism mounted near the first end of the elongated bar;
    a scoop mechanism having an open position and a closed position and is mounted near the second end of the elongated bar, the scoop mechanism is operable to collect pet excrement in response to actuation of the first manually-operated mechanism, the scoop mechanism moves from the closed to the open position when the second handle portion is moved toward the first handle portion;
    a first illumination device mounted near the second end of the elongated bar, the first illumination device illuminates an area outside of the scoop mechanism in response to actuation of the second manually-operated mechanism; and
    a second illumination device mounted near the second end of the elongated bar, the second illumination mechanism illuminates an area inside of the scoop mechanism in response to activation of the first manually-operated mechanism, the switch is arranged to provide power to the second illumination device when the second handle portion is moved toward the first handle portion.

2. A pet excrement collection tool according to claim 1 further comprising:
    a battery holder located inside said first handle portion.

3. A pet excrement collection tool according to claim 2 wherein the second manually-operated mechanism further comprises:
    a second switch mounted to the first handle portion and arranged to provide power to the first illumination device when the second switch is actuated.

* * * * *